Oct. 6, 1964  D. BROIDA  3,152,116
TRIS (HYDROXY METHYL) AMINO METHANE SALTS OF NUCLEOTIDES
Filed May 25, 1960
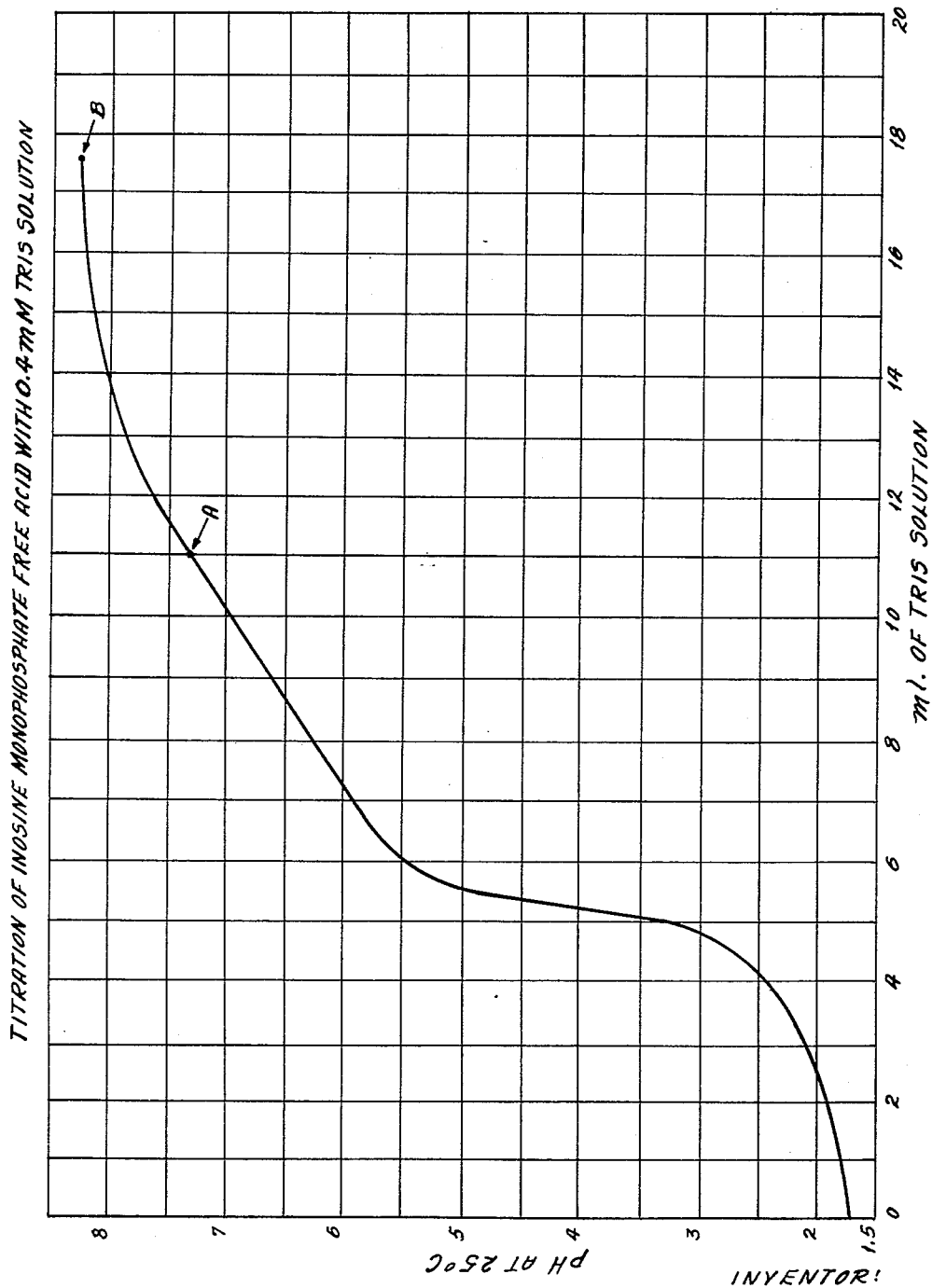

United States Patent Office 3,152,116
Patented Oct. 6, 1964

3,152,116
TRIS (HYDROXY METHYL) AMINO METHANE SALTS OF NUCLEOTIDES
Daniel Broida, St. Louis County, Mo., assignor to Sigma Chemical Company, St. Louis, Mo., a corporation of Missouri
Filed May 25, 1960, Ser. No. 31,635
3 Claims. (Cl. 260—211.5)

This invention relates to tris (hydroxy methyl) amino methane salts of nucleotides, and methods for producing them.

Metallic salts of nucleotides, such, for example, as the sodium and barium salts of adenosine triphosphate, the sodium salt of guanylic acid and the barium salt of inosinic acid are well known. Certain ammonium salts of nucleotides, such, for example, as the ammonium salts of uridylic acid, in which the $(NH_4)^+$ radical takes the place of a metallic cation, are also known. However, there has been a need for nucleotide salts, in dry form, without metallic cations, which can be made in such a way as to produce an exactly predetermined pH in aqueous solutions, through a wide range of pH's, and which are stable in solution. This has not been accomplished heretofore.

One of the objects of this invention is to provide organic salts of nucleotides, in dry form, each of which gives, upon dissolution in water, an exactly predetermined pH, the range of pH's of the various salts being wide, and the salts in solution being stable as biological chemical solutions go.

Another object is to provide methods for producing said salts.

Still other objects will become apparent to those skilled in the art in the light of the following description.

In accordance with this invention, generally stated, a nucleotide free acid is converted to a tris (hydroxy methyl) amino methane salt. In making the conversion, varying amounts of tris (hydroxy methyl) amino methane (hereinafter sometimes referred to as "tris") are combined with nucleotide free acid in aqueous solution to produce the desired predetermined pH values in the solutions. The salt is then removed from solution and converted to dry form. It has been found that such a salt in dry form when reconstituted in solution will produce pH values closely related to those of the solution from which the salt was originally recovered. This holds true for a wide range of pH's. For example, in the case of the salts of adenosine triphosphate the pH range extends from approximately 1.0 to 10.5.

It is to be observed that the tris salts are different in kind from salts which result from a simple neutralization, such as salts resulting from the reaction of a nucleotide free acid with strong bases, such as sodium hydroxide, ammonium hydroxide, etc. In the latter, water is produced, and the salt has certain inorganic characteristics. In the case of the tris salts, while the tris and the nucleotide free acid have an affinity for one another, there appears to be no chemical reaction in the sense in which the word is used in the case of a base-acid neutralization in which a hydroxyl from the base and a hydrogen from the acid are lost to the salts. Also, in contradistinction to salts of strong acids and bases, the tris salts of this invention exert a buffering action at every pH in their range, although the buffering action is more pronounced in the middle area than it is at the extremes.

The nucleotides are extensively used in medical research, since they form part of almost every living thing. The tris salts of nucleotides of this invention are being used in medical research, where they are making possible the observation of reactions of nucleotides and their effect upon living organisms, at controlled pH's and in the absence of metal ions.

The following are illustrative examples of the preparation of tris salts of nucleotide free acids:

*Example 1*

10 grams of disodium adenosine triphosphate are dissolved in 20 ml. of de-ionized water at room temperature, below 30° C. The solution is run through a column of ion exchange resin (such, for example, as Amberlite IR-120) in the hydrogen ion form. The resin of this example is contained in a cylindrical column the cross-sectional area of which is 4 square centimeters, the resin bed height 15 centimeters, and the total volume of resin bed 60 cubic centimeters. The solution is fed by gravity at the rate of 2 ml. per minute. 5 ml. fractions of effluent are collected continuously.

When all of the solution has entered the resin bed, de-ionized water is added in the same manner as the solution, to continue the flow rate at 2 ml. per minute. When a total of 35 fractions have been collected, the collection is discontinued.

The concentration of adenosine triphosphoric acid in the various 5 ml. fractions is determined by measuring the optical density of these solutions at 260 mu. Those containing a significant amount of adenosine triphosphoric acid (fractions 5 through 25) are then combined, making 105 ml. of solution.

The solution is substantially free of sodium ions, as indicated by the failure to obtain the characteristic yellow light when the effluent is subjected to a flame test.

10 grams of tris (hydroxy methyl) amino methane are dissolved in 50 ml. of de-ionized water. The solution is added to the adenosine triphosphoric acid solution, to bring the pH to 4.5.

The solution is then chilled in an ice bath, and four and a half volumes of cold (minus 10° C.) ethyl alcohol is added to the aqueous solution. An oily precipitate is formed, which is centrifuged at 3,000 r.p.m. for five minutes. The supernatant fluid is decanted, and the oily residue is converted to a granular material by desiccation.

The granular material is a tris salt of adenosine triphosphate, substantially free of sodium. The product, dissolved in water, gives a pH of 4.5.

Other methods can be employed for preparing the nucleotide free acid from the metal salt of the nucleotide. For example, the metal salt can be dissolved in a suitable solvent, and the cation can then be precipitated by the addition of an appropriate anion. For example, a barium salt of ATP can be converted to the free acid, by precipitating the barium with sulfate ions. The use of hydrogen sulfide to precipitate lead or mercury ions is another example.

When the reaction between the nucleotide free acid and the tris (hydroxy methyl) amino methane is completed, the solid tris salt can be prepared by other procedures than the one given above. For example, the solution can be evaporated to dryness with or without a vacuum, and with or without the use of a desiccant; the solution can be frozen and reduced to dryness by sublimation, or the tris salt can be precipitated by the addition of organic solvents other than ethyl alcohol, such as methyl alcohol or acetone, or a combination of such solvents.

If the nucleotide is available as the free acid, as opposed to the metal salt of the acid, it is only necessary to dissolve the nucleotide free acid in water, determine its concentration, and add the desired amount of tris. The amount of tris to be added can be determined by the pH desired, as in Example 1.

*Example 2*

As an example of the use of the free acid, to a solution of 10 grams of adenosine triphosphoric acid in deionized water, 2.39 grams of tris (hydroxy methyl) amino methane are added. The tris salt, precipitated as described in Example 1, is the mono tris (hydroxy methyl) amino methane salt of adenosine triphosphate.

If 4.78 grams of tris are added, the resultant salt is the di tris salt of ATP.

If 7.16 grams of the tris ade added, the tri salt results, and if 9.55 grams of tris are added, the tetra salt is produced.

The affinity of the nucleotide free acid for the tris is selective, so that if one equivalent of tris is added, the nucleotide free acid is converted to the mono salt, with no remaining nucleotide free acid. The pH's intermediate the mono and di salts of nucleotide free acid capable of forming multiple salts are thought to be the result of a mixture of the mono and di forms. If two equivalents of tris are added, the nucleotide free acid is converted to the di salt. This selectivity may account for the reliability of the pH upon redissolution of the dry salt.

Examples of tris salts of nucleotides other than adenosine triphosphate, and their preparation, are as follows:

*Example 3*

0.25 grams of the monosodium salt of triphosphopyridine nucleotide are dissolved in 15 ml. of de-ionized water. The resultant pH is 2.50 at 25° C. The solution is run through a column of Amberlite IR–120 in the hydrogen ion form. The resin of this example is contained in a cylindrical column, the cross-sectional area of which is 1 sq. cm.; the resin bed height is 7 cm. and the volume of the resin bed is 7 cu. cm. The solution of the nucleotide salt is fed by gravity at the rate of 1 ml. per minute. Two ml. fractions of effluent are collected continuously. When all of the solution has entered the resin bed, deionized water is added in the same manner as the solution, to continue the flow rate at 1 ml. per minute. When a total of 30 fractions have been collected, the collection is discontinued. The concentration of triphosphopyridine nucleotide free acid in the various 2 ml. fractions is determined by measuring the optical density of these solutions at 260 mu. Those containing a significant amount of the nucleotide free acid (fractions 2 through 20) are then combined, making a total volume of 28.4 ml. The pH of this solution is 2.05 at 25° C. The concentration of nucleotide free acid present is determined by measuring the optical density at 260 mu. This measurement indicates the presence of 0.28 millimoles of triphosphopyridine nucleotide free acid.

The solution is substantially free of sodium ions, as indicated by the failure to obtain the characteristic yellow light when the solution is subjected to a flame test.

16.9 mg. of tris (hydroxy methyl) amino methane are added directly to the solution of the nucleotide free acid and permitted to dissolve. This amount of tris is 0.14 millimoles which is equivalent to one half the number of moles of triphosphopyridine nucleotide free acid present in the solution. The pH of the solution is now 2.27 at 25° C.

205 mg. of a white, fluffy powder are obtained by lyophilization of the solution. 50 mg. of the product dissolved in 5 ml. of deionized water yields a solution which has a spectrum characteristic of triphosphopyridine nucleotide. The pH is equal to 2.22 at 25° C., and the solution is substantially free of sodium ions.

*Example 4*

1.0 gram of inosine monophosphate, monosodium salt, is dissolved in 10 ml. de-ionized water. The pH of this solution equals 4.00 at 25° C. The solution is run through a column of Amberlite IR–120 in the hydrogen ion form. The resin of this example is contained in a cylindrical column, the cross-sectional area of which is 1 sq. cm.; the resin bed height is 12 cm. and the total volume of the resin bed is 12 cu. cm. The solution is fed by gravity at the rate of 1 ml. per minute. 3 ml. fractions of effluent are collected continuously. When all of the solution has entered the resin bed, de-ionized water is added in the same manner as the solution, to continue the flow rate at 1 ml. per minute. When a total of 20 fractions has been collected, the collection is discontinued.

The concentration of inosine monophosphate in the various 3 ml. fractions is determined by measuring the optical density of these solutions at 260 mu. Those containing a significant amount of inosine monophosphate (fractions 2 through 15) are then combined, making 42.5 ml. of final volume.

The solution is substantially free of sodium ions as indicated by the failure to obtain the characteristic yellow light when the effluent is subjected to a flame test. The pH of this solution at 25° C. is 1.65.

Optical density measurements on this solution indicate the characteristic spectrum of inosine monophosphate, and indicate a concentration of 2.00 millimoles of inosine monophosphate present in the 42.5 ml. of solution.

This solution is titrated at 25° C. with a solution of tris containing 0.4 millimoles of tris per ml. of solution, prepared by dissolving 1.21 grams of tris in de-ionized water to a total volume of 25 ml. The titration observed is indicated by the graph, FIG. 1. At point "A" 25 ml. of solution are removed and lyophilized. At point "B" the remaining solution is also lyophilized. Product "A" is a white material weighing 457 mg. 50 mg. are dissolved in 5 ml. of de-ionized water. The solution is substantially free of sodium ions. The pH is 7.25 at 25° C. The ultraviolet spectrum is characteristic of that expected for inosine monophosphate. The product obtained at "B" weighs 632 mg. 50 mg. of the product are dissolved in 5 ml. de-ionized water. The solution shows a spectrum characteristic of inosine monophosphate, and a pH, observed at 25° C., of 8.25.

It is considered that all nucleotide free acids are capable of forming tris salts in accordance with this invention. Examples of other nucleotides capable of forming tris salts in accordance with the process of the examples, are adenosine diphosphate, 2-adenylic acid, 3-adenylic acid, 5-adenylic acid, guanylic acid, uridylic acid, inosinic acid, and the nucleotides of cytosine, guanosine and thymidine. Tris salts can also be prepared of the deoxy and certain other derivatives of the nucleotides, such for example as the di and triphosphopyridine nucleotides and their derivatives, and adenosine 3', 5' cyclic monophosphate.

Having thus described the invention, what is claimed and desired to be secured by Letters Patent is:

1. Dry, stable tris (hydroxy methyl) amino methane salt of adenosine triphosphate substantially free of metallic cations.

2. Dry, stable tris (hydroxy methyl) amino methane salt of a nucleotide of a compound taken from the group consisting of adenine, guanine, cytosine, thymine, hypoxanthine, uracil and pyridine substantially free of metallic cations.

3. The method of preparing dry tris (hydroxy methyl) amino methane salts of a nucleotide free acid, said salts producing a desired accurately predeterminable pH in solution, comprising combining, in solution, with a nucleotide free acid taken from the group consisting of adenosine triphosphate, adenosine diphosphate, triphospho pyridine nucleotide, diphospho pyridine nucleotide, inosine monophosphate, 2-adenylic acid, 3-adenylic acid, 5-adenylic acid, guanylic acid, uridylic acid, inosinic acid and the nucleotides of cytosine, guanosine and thymidine, an amount of tris (hydroxy methyl) amino methane sufficient to form the desired tris salt which when abstracted from solution and dehydrated will produce a particular pH when redissolved, abstracting the formed salt from solution, and dehydrating said salt.

References Cited in the file of this patent
UNITED STATES PATENTS
2,710,860 Ruskin _____ June 14, 1955

OTHER REFERENCES
"The Merck Index" 7th Ed., 1960, p. 1071, Merck and Co., Inc., Rahway N. J.